United States Patent [19]

Gregoire

[11] Patent Number: 4,903,950
[45] Date of Patent: Feb. 27, 1990

[54] HYDRAULIC ANTIVIBRATORY SUPPORTS

[75] Inventor: Daniel Gregoire, Chateaudun, France

[73] Assignee: Hutchinson, France

[21] Appl. No.: 260,675

[22] Filed: Oct. 21, 1988

[30] Foreign Application Priority Data

Oct. 23, 1987 [FR] France .................................. 87 14695

[51] Int. Cl.⁴ ...................... F16M 5/00; F16M 13/00; F16F 1/36
[52] U.S. Cl. ................................ 267/140.1; 248/562; 267/149
[58] Field of Search ...................... 267/219, 140.1, 35, 267/140.4, 141, 147, 148, 149; 180/300, 312; 248/562, 570, 573, 636, 638; 123/192 R, 195 A

[56] References Cited

U.S. PATENT DOCUMENTS

| | | | |
|---|---|---|---|
| 1,671,764 | 5/1928 | Dickey | 267/140.4 X |
| 2,156,301 | 5/1939 | Loewus | 267/141 |
| 3,204,913 | 9/1965 | Lawrence et al. | 267/148 X |
| 4,741,520 | 5/1988 | Bellamy et al. | 267/140.1 |

FOREIGN PATENT DOCUMENTS 0026016 2/1982 Japan ................................ 267/140.1

Primary Examiner—Robert J. Oberleitner
Attorney, Agent, or Firm—Larson and Taylor

[57] ABSTRACT

A hydraulic antivibratory support is provided comprising a rigid base (4), a rigid annulus (1), a resilient annular support wall (6) sealingly connecting the base to the annulus and a flexible membrane (7) sealingly connected to the annulus, the inside of the sealed case thus formed being divided by a sealed dividing wall into two chambers connected together through a restricted passage, and a liquid mass filling the two chambers. A traction resistant cable section (13) is situated inside the support and is fixed to the case and to the rigid annulus so that the relative movements of these two elements away from each other are limited by said cable section being placed under traction.

9 Claims, 2 Drawing Sheets

HYDRAULIC ANTIVIBRATORY SUPPORTS

FIELD OF THE INVENTION

The invention relates to antivibratory devices for fitting, for supporting and shock absorbing purposes, between two rigid elements individually subjected to certain oscillations and/or vibrations, the shock absorbing, under certain operating conditions, causing a liquid to be driven through a restricted passage.

BACKGROUND OF THE INVENTION

By way of non limitative example, such supports may be fitted between a vehicle chassis and the internal combustion engine of this vehicle for absorbing not only the "hash" oscillations imposed on the chassis through the unevenness and variations of the slope of the ground when the vehicle is travelling over this ground but also the vibrations due to the operation of the engine, particularly when idling, or else at the time of the shocks applied to this engine during starting and stopping respectively by the first and last explosions.

The invention relates more particularly, among the supports of the kind in question, to those which are formed by a sealed case fitted between the two rigid elements, which case has a rigid base able to be fixed to one of the two rigid elements, a rigid annulus which can be fixed to the other rigid element, a resilient annular support wall sealingly connecting the base to the annulus and a flexible membrane connected sealingly to the annulus, the inside of this case being divided, by a sealed dividing wall connected to the annulus between the annular wall and the membrane, into two chambers, namely a work chamber on the annular wall side and a compensation chamber on the membrane side, these two chambers permanently communicating with each other through the above restricted passage, which is advantageously formed by a curved channel situated in the connection zone between the annular wall and the annulus, and a liquid mass filling the two chambers as well as the restricted passage.

The invention relates more particularly still, but not exclusively, to the case where the sealed intermediate dividing wall comprises a deformable or mobile portion forming a floating "valve" and means for limiting the amplitude of the movements of this valve to a low value, preferably less than 0.5 mm.

With such a support, the oscillations or vibrations created between the two rigid elements result in moving these two elements towards or away from each other axially in turn.

Those of these oscillations called "hash" which have a relatively low frequency (less than 20 Hz) and a relatively high amplitude (greater than 0.5 mm) cause the liquid to be driven from one of the two chambers into the other through the restricted passage and conversely and, for a given value of said frequency depending essentially on the dimensions of said passage, high damping of the oscillations considered can be observed because of the resonance effect of the liquid mass flowing through this passage.

In preferred constructions comprising a valve such as defined above, those of the oscillations considered which have a relatively high frequency (greater than 20 Hz) and a relatively low amplitude (less than 0.5 mm) result in corresponding oscillations of the valve without there being a veritable transfer of liquid through the restricted passage, which causes the transmission of the oscillations in question to be filtered from the rigid element where they are generated to the other rigid element.

With known embodiments of supports of the kind in question, the supported weight (engine or similar) is only connected to the carrier structure (vehicle chassis) by the resilient annular wall of the supports.

It may then happen that certain abnormally high forces exerted on the supported mass, such as those due to sudden deceleration or acceleration of the vehicle, result in excessive deformation of these walls which may cause tearing or rupture thereof: the supported mass is then no longer connected to the carrier structure and serious damage may result.

To overcome such a drawback, it has already been proposed to provide the supports considered with:

a rigid ring inside the work chamber and fixed to the rigid annulus, and a rigid foot axially extending the base inwardly of the work chamber, which foot passes through said ring with a clearance and ends in a projecting sole which cannot pass through this ring.

In such a case, the mutual movements of the base with respect to the annulus in the direction in which these two elements move away from each other, due to the exertion of high forces on the supported mass, are automatically limited by abutment of the sole against the ring.

Such constructions often give satisfaction.

But they have certain drawbacks such as a relatively high overall axial size, a relatively high weight and are difficult to fit.

The object of the invention is especially to overcome these drawbacks.

SUMMARY OF THE INVENTION

For this, the supports of the kind in question according to the invention are essentially characterized in that they comprise at least one flexible traction-resistant cable section situated inside the work chamber and secured both to the base and to the rigid annulus so that the relative movements of the base with respect to the rigid annulus in their axial mutual moving-away direction are limited by placing said section under traction.

In preferred embodiments, recourse is further had to one and/or the other of the following arrangements:

the cable section is in the form of a continuous closed and deformed annulus, whose axis merges with that of the support, the annulus has two first segments resting on two guide channels fixed to the base and two second segments disposed in guide slots associated with the annulus and extending to the periphery of the intermediate dividing wall, the first two above annular segments are connected to the second segments by four oblique segments immersed in the work chamber, the four third segments extend away from the first two, the above guide slots are partially defined by a circular indented profiled piece which itself serves for partially defining the restricted passage, with possible interpositioning of an elastomer layer, the cable section is formed by a bundle of traction resistance strands, which bundle is surrounded by a protection sheath which also surrounds at least the support channels of the first segments, the cable section is formed from a composite material having a plastic material matrix reinforced by parallel continuous fibres, the fibres of the preceding paragraph are formed from glass, carbon or an aramide such as poly(1,4-phenylene)terephtalamide commercialized under the name KEVLAR by the firm du Pont de Nemours.

Apart from these main arrangements, the invention comprisees certain other arrangeents which are preferably used at the same time and which will be more explicitly discussed hereafter.

BRIEF DESCRIPTION THE DRAWINGS

In the following discussion, two preferred embodiments of the invention will be described with reference to the accompanying drawings in a way which is of course in no wise limitative.

FIGS. 1 and 2 of these drawings show a hydraulic antivibratory support constructed in accordance with the invention in two vertical axial sections perpendicular to each other, namely the first through I—I of FIG. 2 and the second through II—II of FIG. 1.

DETAILED DESCRIPTION OF THE PREFERRED EMBODIMENTS

Figure 1:
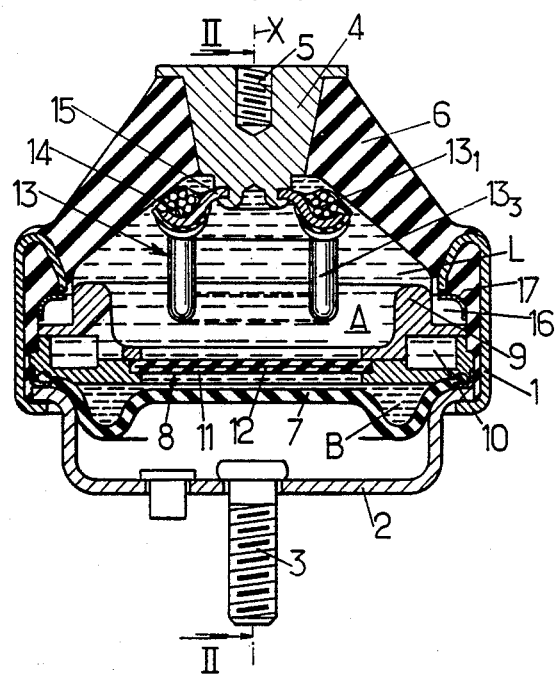
Figure 3:
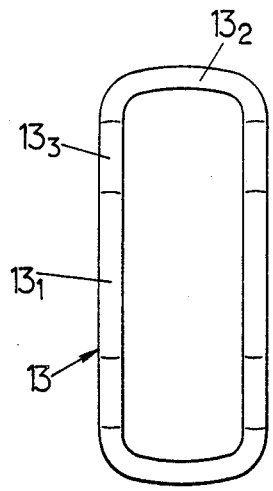
FIGS. 3 and 4 show respectively in a top view and in perspective, the annular cable which equips this support, FIG. 4 further showing the fastener for fastening said cable to the base of the support.

In each case, the support considered is generally intended to be fitted vertically or in a direction slightly slanted from the vertical, between a rigid carrier member formed by a vehicle chassis and a rigid supported member formed by an internal combustion engine.

The terms "top, bottom, upper, lower, cup" used in the following description are in no wise limitative for the support described may be perfectly well used upside down with respect to the direction adopted for this description.

The support has the general shape of a sealed case of revolution about an axis X comprising:

a rigid annulas 1 fitted on the external edge of a metal cup 2 which includes a bolt 3 ready for fixing this cup to the vehicle chassis, an upper base 4 in the form of a block formed with a blind threaded hole 5 opening upwardly for receiving a bolt fixing this base to the engine of the vehicle, a resilient annular wall 6 sufficiently thick to transmit the loads of the engine to the chassis, which wall is substantially defined by two truncated cone shaped surfaces widening downwards and the small base of which, disposed at the top, is adhered to base 4, its large lower base being sealingly connected to annulus 1, and a lower sealed and flexible membrane 7 contained inside cup 2, the edge of this membrane being sealingly fixed to annulus 1.

An intermediate dividing wall 8 divides the inside of the case thus formed into two chambers, namely an upper work chamber A and a lower compensation or balancing chamber B.

For this purpose, the periphery 9 of dividing wall is sealingly connected to annulus 1 between the thick wall 6 and membrane 7.

A restricted passage 10 causes the two chambers A and B to communicate permanently with each other.

This passage 10 is here formed by at least one curved channel extending along an arc of a circle about the axis X, which channel is formed in the periphery of dividing wall 8.

The central portion of the intermediate dividing wall 8 is formed by a flexible membrane 11, the amplitude of the movements of which is limited to a low value, e.g. about 0.5 mm, by an internal frame 12 embedded in this membrane.

Furthermore, and so as to prevent any rupture of the resilient annular wall 6, e.g. by axial stretching, when high forces are exerted on the base 5 with respect to annulus 1, e.g. because of sudden acceleration or deceleration of the vehicle, this base is fixed to the annulus by means of at least one traction resistant cable section 13.

This cable section is dimensioned and adapted so that it is subjected to tractive forces when the base and the anulus move away from each other by a value considered as a maximum threshold not to be exceeded.

In the embodiments illustrated, the cable section is in the form of a continuous and closed but deformed loop.

This closed loop cable 13 is secured to base 4 by placing two parallel rectilinear segments $13_1$ of said cable in respectively two parallel channels 14 formed along the two opposite edges of a thick and deformed plate 15, which is crimped below the base.

Cable 13 is secured to the rigid annulus 1 by placing two curved segments $13_2$ of said cable in two sections of an annular slot 16 formed at the periphery of the intermediate dividing wall 8.

In the embodiment shown in FIGS. 1 to 4, these slot sections 16 are disposed about a peripheral shoulder or step 9 of said intermediate dividing wall 8: more precisely, they are defined on the inside and at the bottom by annular surfaces of said peripheral shoulder 9, on the outside and the top by two annular surfaces of the rigid annulus 1, with interpositioning, for the latter surfaces, of an elastomer layer integrally moulded with wall 6.

The upper annular surface is for example formed by the end face of the upper annular edge, bent inwardly and downwardly, of an external collar forming annulus 1.

Figure 2:
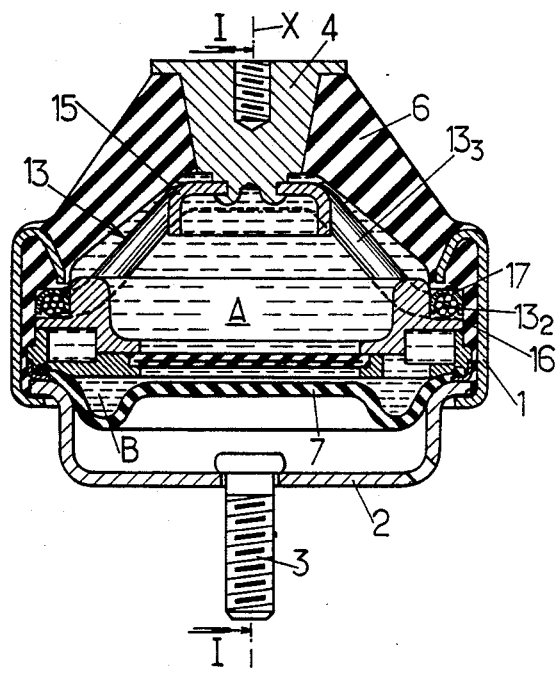
Figure 4:
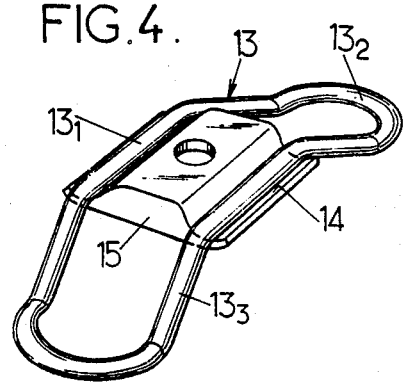

Furthermore, a semi toric protection ring 17 is provided for covering said curved cable segments $13_2$ as can be seen in FIG. 2.

As shown in FIGS. 1 to 4, the rectilinear segments $13_1$ and curved segments $13_2$ are connected together by four oblique rectilinear segments $13_3$ immersed in the work chamber A.

The length of the cable 13 is chosen so that:

this cable is in an unstretched condition, i.e. "floating", during normal operation of the support under load, which in no wise affects the different shock-absorbing functions of the support, and the maximum tensioning of said cable corresponds to the maximum admissible deformation for wall 6 during the application of a high axial tractive force on base 4 with respect to annulus 1, which force results in these two parts moving axially away from each other.

Of course, the nature and section of cable 13 are chosen so that it can, without deformation or rupture, absorb the tractive forces applied thereto from the moment when it has reached its maximum tensioned condition.

Cable 13 is advantageously formed by a bundle of individual parallel or twisted strands which may be made from metal, the bundle then being coated with a sheath for protection against the liquid L.

It may also be formed by strands made from a composite material having high tensile strength and comprising parallel continuous fibres embedded in a plastic material matrix.

Said fibres are formed more especially from glass, carbon or an aramide such as that commercialized under the name KEVLAR by the firm du Pont de Nemours (namely a poly(1,4-phenylene)terephtalamide) or the one commercialized under the name TWARON by the firm Akzo: the basic glass fibre strands thus formed have a tensile strength greater than 1 kN/m$^2$.

The strands in question may themselves be coated with any desirable sheath.

Figure 5:
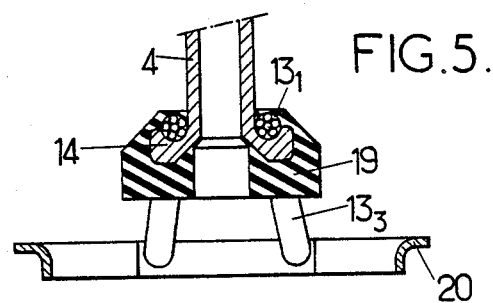
FIGS. 5, 6 and 7 shows the annular cable equipping another hydraulic support in accordance with the invention, with its fasteners, respectively in two axial sections through V—V and VI—VI of FIG. 7 and in a top view.
Figure 6:
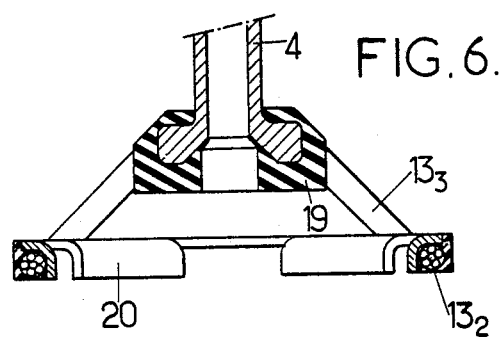
Figure 7:
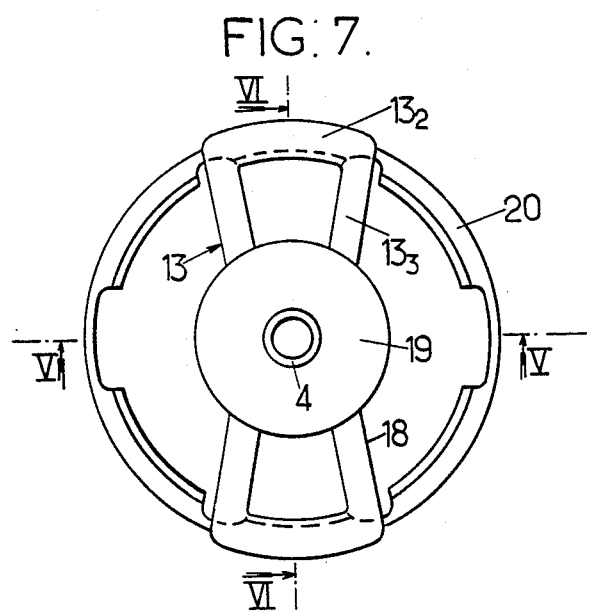

In the embodiment shown particularly in FIGS. 5 to 7, the elements identical to those described above have been given the same reference numbers as before.

Furthermore, to take into account the conical shape of wall 6, the two channels 14 are very close together so that the oblique connecting segments $3_3$ extend away from these channels.

Considering the fitting method proposed for the annular cable 13, it is possible to preform this cable in its continuous closed loop shape, e.g. by winding strands, then coating it with an elastomer or similar sheath 18.

This sheath 18 may be extended about the channels 14 so as to form thereunder a cushion 19.

This cushion 19 flexibly absorbs the axial crushing of the support by application thereof, with progressive compression, against an appropriate facing surface, for instance a metal grid limiting the movements of the above membrane 11.

Said cushion 19 may also be used for the "piston" effect which it may exert because it may define inwardly, within the work chamber A, an annular restricted passage playing an antivibratory role in the same way as passage 10.

The "second sections" $13_2$ of the cable loop are here anchored by means of an annular L shaped profiled part 20, locally indented, which serves to partially define the restricted passage 10, with possible local interpositioning of an elastomer layer.

Following which, and whatever the embodiment adopted, a hydraulic antivibratory support is finally obtained whose construction and operation are sufficiently clear from the foregoing.

These supports offer a very high tractive tear strength compared with those known heretofore, with a relatively small axial dimension and an external appearance quite identical to those of the supports of the same kind of the prior art, the fastening cables capable of withstanding tractive forces being disposed inside said supports.

They also have good resistance to radial forces, which resistance is different in the radial directions since it is higher in the plane which connects the axis to the middles of the second sections than in the plane perpendicular to this plane.

As is evident, and as follows from the foregoing, the invention is in no wise limited to those of its modes of application and embodiments which have been more especially considered; it embraces, on the contrary, all variants thereof, particularly those in which the inner cable sections for withstanding the tearing forces of the supports considered have other forms than that of single closed continuous annuli, e.g. in the form of several separate annuli, more particularly three annuli spaced apart respectively by 120° about the axis of the support and fastened together along two surfaces belonging respectively to base 4 and annulus 1, or else in the form of a plurality of rectilinear cable sections also fastened by their ends to the two above parts, e.g. by cooperation of their thickened ends in any desirable way with forks or eyelets which these ends cannot pass through and which are integral with said parts.

I claim:

1. A hydraulic antivibratory device having a central axis and adapted to be placed between rigid elements, comprising a rigid base capable of being fixed with respect to one of the two rigid elements, a rigid annulus capable of being fixed with respect to the other rigid element, a resilient annular support wall sealingly connecting the base to the annulus and a flexible membrane connected sealingly to the annulus, the resilient annular support wall together with the base, the annulus and the flexible membrane forming a sealed case, the inside of the sealed case being divided, by a sealed dividing wall connected to the annulus between the annular wall and the membrane, into two chambers, namely a work chamber on the annular wall side of the dividing wall and a compensation chamber on the membrane side of the dividing wall, these two chambers permanently communicating with each other through a restricted passage, a liquid mass filling the two chambers as well as the restricted passage, and at least one flexible traction resistant cable section situated inside the work chamber and secured both to the rigid base and to the rigid annulus so that the relative movements of the rigid base with respect to the rigid annulus in their axial mutual moving away from each other is limited by said cable section being placed under traction, the cable section being in the form of a continuous closed loop, the axis of which merges with that of the hydraulic antivibratory device, the cable loop having two first segments resting on two guide channels fixed to the base and two second segments disposed in two guide slots associated with the annulus and extending to the periphery of the said dividing wall.

2. A device according to claim 1, wherein the said two first loop segments are connected to the two said second loop segments by four oblique third segments which are immersed in the work chamber.

3. A device according to claim 2, wherein the four third segments extend away from the two said first segments.

4. A device according to claim 1, wherein the said guide slots are partially defined by a circular indented profile piece which partially defines the said restricted passage.

5. A device according to claim 1, wherein the cable section is made from a composite material having a plastic material matrix reinforced by parallel continuous fibers.

6. A device according to claim 5, wherein the fibers are made from glass.

7. A device according to claim 5, wherein the fibers are made from carbon.

8. A device according to claim 5, wherein the fibers are made from an aramide.

9. A device according to claim 1, wherein the cable section is coated with a protective sheath which also coats at least the said guide channels.

* * * * *